United States Patent [19]
Bolton

[11] 3,890,752
[45] June 24, 1975

[54] SECURING GLAZING RAILS TOGETHER

[75] Inventor: Frank Edmund Bolton, Royal Leamington Spa, England

[73] Assignee: Banbury Buildings Holdings Limited, Warwickshire, England

[22] Filed: Nov. 20, 1973

[21] Appl. No.: 417,561

[30] Foreign Application Priority Data
June 23, 1973 United Kingdom............. 29950/73

[52] U.S. Cl. .................. 52/495; 52/726; 52/460
[51] Int. Cl. ............................................. E04c 3/06
[58] Field of Search ............ 52/460, 463, 465, 502, 52/495, 726, 758 C; 403/363, 306, 312, 300; 47/17

[56] References Cited
UNITED STATES PATENTS

| 1,053,173 | 2/1913 | Hilgendorf | 403/300 |
| 1,707,798 | 4/1929 | Dickson | 52/463 |
| 2,682,321 | 6/1954 | Brock | 403/306 |
| 2,696,139 | 4/1954 | Attwood | 52/758 C |
| 3,035,669 | 5/1962 | Graff | 52/730 |
| 3,275,355 | 9/1966 | Endler | 403/300 |
| 3,395,542 | 8/1968 | Deloffre | 403/363 |
| 3,640,557 | 2/1972 | Nate | 52/726 |

FOREIGN PATENTS OR APPLICATIONS

| 815,617 | 7/1959 | United Kingdom | 52/502 |
| 853,429 | 11/1960 | United Kingdom | 52/758 C |
| 500,623 | 2/1959 | United Kingdom | 52/460 |
| 650,239 | 2/1951 | United Kingdom | 52/463 |
| 717,384 | 1/1932 | France | 52/463 |
| 326,875 | 1/1958 | Switzerland | 52/465 |

Primary Examiner—Frank L. Abbott
Assistant Examiner—Henry Raduazo
Attorney, Agent, or Firm—Edward F. Connors

[57] ABSTRACT

A connector for rigidly connecting together end-to-end two lengths of glazing rail of the kind providing a rib extending parallel to an edge of a pane of glazing material to be supported by the rail, the rib having a cross-section of channel shape inverted with respect to the plane of the pane and having in its wall remote from the pane, a longitudinal slot giving access to an undercut longitudinal recess defined in the rib, the connector having a cross-section of channel shape to fit closely over the ribs of the rails to bridge abutting end portions thereof, the inner face of the base of the connector being formed with an inwardly-projecting tongue to be fitted into the slots in the outer faces of the ribs of the rails, whereby the latter are held from lateral and twisting movement relatively to one another by engagement of the sides of the connector with respective sides of the ribs of the rails and by engagement of the tongue on the connector in the slots in the ribs of the rails, the connector being secured to each rail by a fastener of which the inner end is retained in the undercut recesses in the rails.

1 Claim, 4 Drawing Figures

SECURING GLAZING RAILS TOGETHER

The invention relates to the securing together of glazing rails and is particularly, but not exclusively, concerned with the securing together of glazing rails in a greenhouse or like structure.

Glazing rails of a greenhouse or like structure either have to be made in continuous lengths dictated by the size of the structure or in shorter lengths secured together end-to-end. The securing together of shorter lengths of glazing rails to form a readily assembled but rigid structure has proved to be difficult as specially shaped connecting plates to be bolted or similarly secured to the glazing rails to be secured together have to be used, according to the cross-sectional shape of the glazing rails, and because the positioning of the nuts and bolts, screws or like securing means is often prevented by the glazing panes or vice versa. An object of the invention is to provide a connector whereby glazing rails of a greenhouse can be made in lengths which can be readily assembled and which are sufficiently short as to be packed in a container which can be conveyed by the postal services. For example, where the glazing rails are to be despatched packed in a container conveyed by post they would need to be in lengths not exceeding three feet.

Accordingly the invention provides a connector for rigidly connecting together end-to-end two lengths of glazing rail of the kind providing a rib extending parallel to an edge of a pane of glazing material to be supported by the rail, the rib having a cross-section of channel shape inverted with respect to the plane of the pane and having in its wall remote from the pane, a longitudinal slot giving access to an undercut longitudinal recess defined in the rib, the connector having a cross-section of channel shape to fit closely over the ribs of the rails to bridge abutting end portions thereof, the inner face of the base of the connector being formed with an inwardly-projecting tongue to be fitted into the slots in the outer faces of the ribs of the rails, whereby the latter are held from lateral and twisting movement relatively to one another by engagement of the sides of the connector with respective sides of the ribs of the rails and by engagement of the tongue on the connector in the slots in the ribs of the rails, the connector being secured to each rail by a fastener of which the inner end is retained in the undercut recesses in the rails.

Preferably, the depth of the tongue on the connector is substantially equal to the thickness of the wall of the rib of the rail in which the slot is formed, whereby the inner face of the tongue on the connector is substantially flush with the inner face of the wall of the rib of the rail.

Conveniently, each fastener is a bolt and nut, the head of the bolt being retained in the undercut recess in the appropriate rail and restrained from rotation by side walls defining the recess therein and the shank of the bolt passing through aligned holes in the rail and the connector respectively.

The invention also provides a greenhouse or like structure, or a kit of parts therefor, including at least a pair of glazing rails connectable together end-to-end, each glazing rail being of the kind providing a rib extending parallel to an edge of a pane of glazing material to be supported by the rail, the rib having a cross-section of channel shape inverted with respect to the plane of the pane and having in its wall remote from the pane, a longitudinal slot giving access to an undercut longitudinal recess defined in the rib, and a connector having a cross-section of channel shape to fit closely over the ribs of the rails to bridge abutting end portions thereof, the inner face of the base of the connector being formed with an inwardly-projecting tongue to be fitted into the slots in the outer face of the ribs of the rails, whereby the latter are held from lateral and twisting movement relatively to one another by engagement of the sides of the connector with respective sides of the ribs of the rails and by engagement of the tongue on the connector in the slots in the ribs of the rails, the connector being secured to each rail by a fastener of which the inner end is retained in the undercut recesses in the rails.

By way of example, a connector in accordance with the invention for rigidly connecting together end-to-end two lengths of glazing rail in a greenhouse or like structure, is now described with reference to the accompanying drawings, in which.

Figure 1:
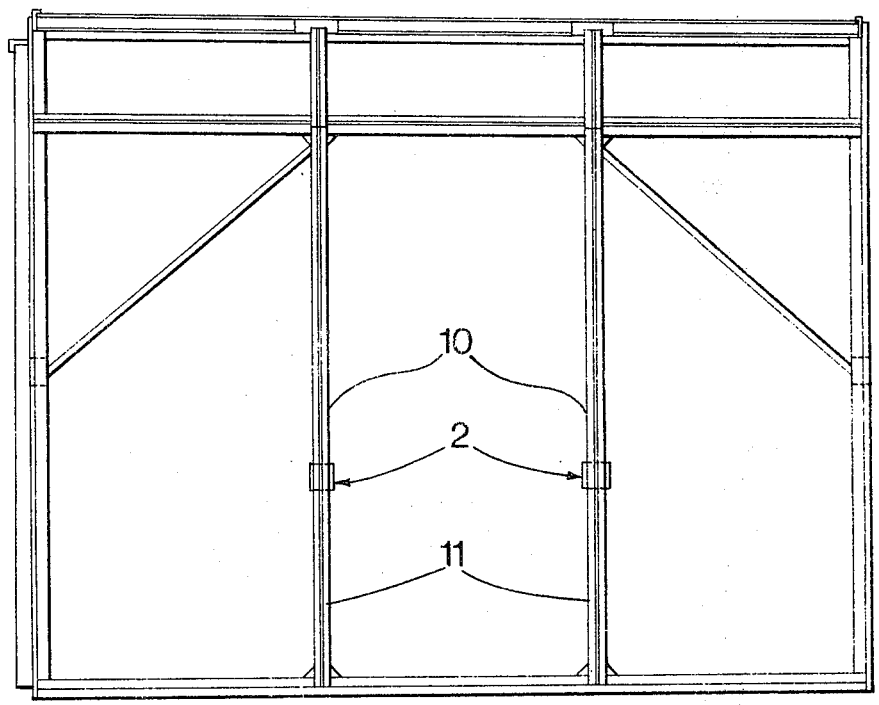
FIG. 1 is a side view of an assembled greenhouse frame.
Figure 2:
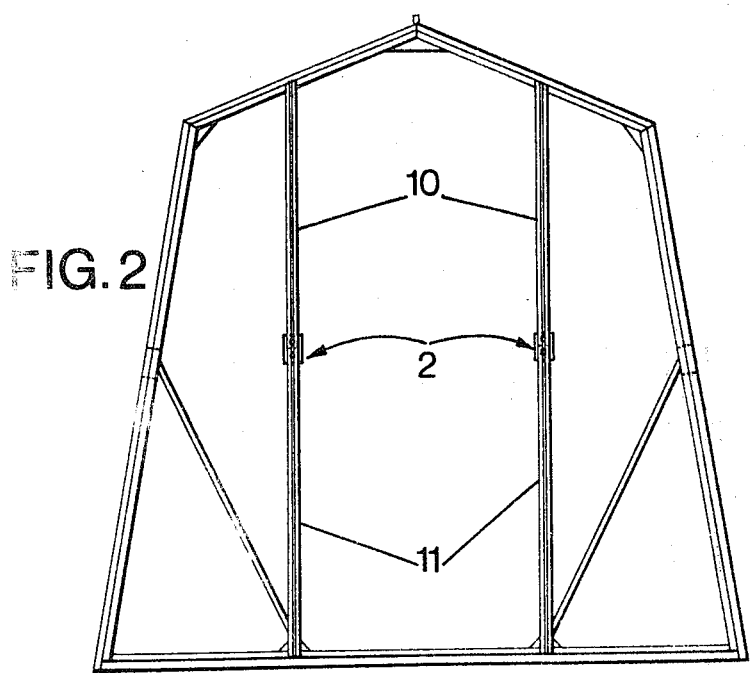
FIG. 2 is a rear end view of the greenhouse frame shown in FIG. 1.

Referring firstly to FIGS. 1 and 2, the greenhouse structure is assembled from lengths of glazing rail, each length not exceeding three feet, the maximum length that can be sent by post. The glazing rail lengths are connected together end-to-end by joints including connectors secured to the rails by bolts and nuts. The present invention is concerned with the connector used at the joints in the intermediate upright members of the frame in the sides and rear end thereof. These joints are indicated as joint 2 in FIGS. 1 and 2.

Figure 3:
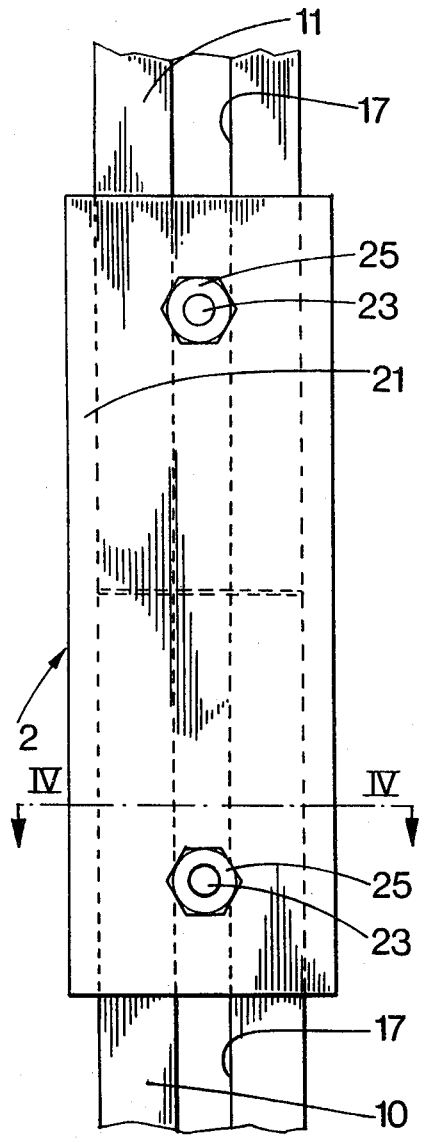
FIG. 3 is an elevation to a larger scale of a joint between pairs of glazing rails shown in FIGS. 1 and 2 incorporating the connector in accordance with this invention.
Figure 4:
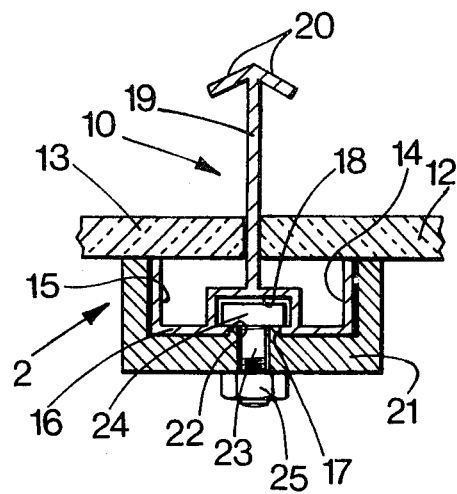
FIG. 4 is a section through the joint shown in FIG. 3 on the line IV—IV therein.

Referring now to FIGS. 3 and 4, the glazing rail lengths 10, 11 to be connected by the joints 2 are each of the cross-sectional shape shown in FIG. 4 and extend between two panes of glass 12, 13 or other glazing material. The shape of the rail defines an internal rib of channel-section inverted with respect to the plane of the panes 12, 13 and having side walls 14, 15 and an end wall 16 in which there is a longitudinal slot 17 giving access to an undercut longitudinal recess 18. A central web 19 of the rail extends between the panes 12, 13 and has external flanges 20 forming a V-shaped end. Glazing clips (not shown) are located between the flanges 20 and the panes 12, 13 to hold the latter against the longitudinal edges of the side walls 14, 15 as shown in FIG. 4. Each joint 2 comprises a connector 21 having a cross-section of channel shape which embraces the end wall 16 and side walls 14, 15 of the rib on the rails. The inside of the base wall of the connector 21 has a longitudinal projection forming a tongue 22 which fits into the longitudinal slot 17 in the end wall 16 of the rib. The connector bridges the abutting end edges of the rails 10, 11 and extends a substantial distance (say 3.75 cm) on each side of the line of abutment. Thus when the connector 21 is clamped to the rails 10, 11 as hereinafter described, the sides and base of the connector and the tongue 22 will hold the rails from relative lateral and twisting movement. The connector is clamped to the rails by a pair of bolts 23 which have heads 24 held in the recess 18 from withdrawal therefrom and turning therein and shanks which extend through aligned holes in the connector 21 and the respective rail. The bolts 23 are engaged by nuts 25 which are tightened to clamp the connector to the rails and thereby hold the rails from relative longitudinal movement and relative lateral and twisting movement as already described.

What I claim as my invention and desire to secure by Letters Patent of the United States is:

1. A greenhouse or like structure including a glazing assembly comprising at least a pair of glazing rails connected together end-to-end and a pane of glazing material supported by said rails along an edge of said pane, a rib on each said rail extending longitudinally thereof and having a cross-section of channel shape inverted with respect to the plane of the pane and having in its wall remote from the pane, a longitudinal slot giving access to an undercut longitudinal recess defined in the rib, and a connector having a cross-section of channel shape to fit closely over the ribs of the rails to bridge abutting end portions thereof, the inner face of the base of the connector being formed with an inwardly-projecting tongue fitted into the slots in the outer faces of the ribs of the rails, whereby the latter are held from lateral and twisting movement relatively to one another by engagement of the sides of the connector with respective sides of the ribs of the rails and by engagement of the tongue on the connector in the slots in the ribs of the rails, the connector including a fastener by which said connector is secured to each said rail, said fastener having an inner end retained in the undercut recesses in the rails.

* * * * *